United States Patent
Agata et al.

(10) Patent No.: US 8,018,438 B2
(45) Date of Patent: Sep. 13, 2011

(54) INFORMATION PROCESSING APPARATUS AND PROCESSING PROGRAM IN INFORMATION PROCESSING APPARATUS

(75) Inventors: Kenichi Agata, Tokyo (JP); Hiroki Tamai, Kanagawa (JP); Eiji Tamaki, Kanagawa (JP); Takashi Sato, Tokyo (JP); Jian Wang, Tokyo (JP); Nozomi Ozaki, Kanagawa (JP); Mikio Sakemoto, Saitama (JP)

(73) Assignee: Sony Corporation, Tokyo (JP)

(*) Notice: Subject to any disclaimer, the term of this patent is extended or adjusted under 35 U.S.C. 154(b) by 1413 days.

(21) Appl. No.: 11/188,697

(22) Filed: Jul. 26, 2005

(65) Prior Publication Data

US 2006/0038775 A1 Feb. 23, 2006

(30) Foreign Application Priority Data

Aug. 19, 2004 (JP) ................... 2004-239687

(51) Int. Cl.
G09G 5/00 (2006.01)
(52) U.S. Cl. .................... 345/168; 345/156
(58) Field of Classification Search .......... 345/156–178; 341/20, 22
See application file for complete search history.

(56) References Cited

U.S. PATENT DOCUMENTS 5,189,632 A * 2/1993 Paajanen et al. ............ 708/109
6,654,896 B1 * 11/2003 Saunders et al. ............ 713/323

FOREIGN PATENT DOCUMENTS

| JP | 2-58820 | 4/1990 |
|---|---|---|
| JP | 2001-282388 | 10/2001 |
| JP | 2002-073255 | 3/2002 |
| JP | 2002-278675 | 9/2002 |
| JP | 2003-271280 | 9/2003 |
| JP | 2003-289359 | 10/2003 |
| WO | WO 2004/059949 A1 | 7/2004 |

* cited by examiner

*Primary Examiner* — Nitin Patel
(74) *Attorney, Agent, or Firm* — Oblon, Spivak, McClelland, Maier & Neustadt, L.L.P.

(57) ABSTRACT

The present invention provides an information processing apparatus including: a keyboard that has a plurality of operating keys and is foldable via a hinge part, the keyboard being set in a closed state in which the operating keys are closed and in an opened state in which the operating keys are opened; and an apparatus main unit that is connected with the keyboard and performs a process corresponding to an operation of the operating keys on the keyboard. The closed state and the opened state of the keyboard are detected, and operation of one of the apparatus main unit and the keyboard is controlled according to a detection result.

9 Claims, 13 Drawing Sheets

INFORMATION PROCESSING APPARATUS AND PROCESSING PROGRAM IN INFORMATION PROCESSING APPARATUS

BACKGROUND OF THE INVENTION

The present invention relates to a technical field of an information processing apparatus and a processing program in the information processing apparatus, and particularly to a technical field in which usability of the information processing apparatus is improved and appropriate operation is performed by effecting control according to a result of detection of an opened state or a closed state of a foldable keyboard.

Information processing apparatuses typified by personal computers have an apparatus main unit incorporating predetermined processing means, controlling means, and the like and a keyboard, for example, for inputting various information to a display. The apparatus main unit and the keyboard are connected to each other via a predetermined port provided for the apparatus main unit, for example a PS/2 (Personal System/2) port or a USB (Universal Serial Bus) port.

With some of such information processing apparatuses, the keyboard is foldable via a hinge part. Operating keys provided on the keyboard are operated in an opened state of the keyboard, and improvement in portability and space saving are achieved by closing and folding the keyboard (see for example Japanese Patent Laid-Open No. 2002-73255).

SUMMARY OF THE INVENTION

With the conventional information processing apparatus described above, however, no consideration is given to an unusable state of the keyboard. For example, even when the keyboard is closed and is thus in an unusable state, the same power supply as when the keyboard is in an opened state is performed to the keyboard, and even when the keyboard is in the closed state, an application supposing use of the keyboard can be started.

Thus, there is a lot of unnecessity in operation, and it is difficult to say that good usability is provided for a user.

There is a need for an information processing apparatus and a processing program in the information processing apparatus according to embodiments of the present invention to solve the above-described problems, and improve usability of the information processing apparatus and make operation of the information processing apparatus appropriate.

According to an embodiment of the present invention, there is provided an information processing apparatus including a keyboard that has a plurality of operating keys and is foldable via a hinge part, the keyboard being set in a closed state in which the operating keys are closed and in an opened state in which the operating keys are opened, and an apparatus main unit that is connected with the keyboard and performs a process corresponding to an operation of the operating keys on the keyboard. The closed state and the opened state of the keyboard are detected, and operation of one of the apparatus main unit and the keyboard is controlled according to a detection result.

According to an embodiment of the present invention, there is provided a processing program in an information processing apparatus. The processing program includes the steps of detecting the closed state and the opened state of the keyboard, and controlling operation of one of the apparatus main unit and the keyboard according to a result of detection in the detecting step.

Thus, in the information processing apparatus and the processing program in the information processing apparatus according to the embodiments of the present invention, the apparatus main unit or the keyboard is operated on the basis of control according to a result of detection of the closed state and the opened state of the keyboard.

The information processing apparatus according to an embodiment of the present invention includes a keyboard that has a plurality of operating keys and is foldable via a hinge part, the keyboard being set in a closed state in which the operating keys are closed and in an opened state in which the operating keys are opened; and an apparatus main unit that is connected with the keyboard and performs a process corresponding to an operation of the operating keys on the keyboard. The closed state and the opened state of the keyboard are detected, and operation of one of the apparatus main unit and the keyboard is controlled according to a detection result.

Hence, appropriate operation can be performed according to a state of use of the keyboard, and usability of the information processing apparatus can be improved.

According to an embodiment of the present invention, when the closed state of the keyboard is detected, supply of power to the keyboard is limited, and a low power consumption mode is set. Therefore unnecessary power consumption is prevented, and power can be saved.

According to an embodiment of the present invention, when the closed state of the keyboard is detected, one of operating means provided to the apparatus main unit, for performing various operations, and inputting means provided to the apparatus main unit, for inputting various information, is set in a usable state. Thus, functions necessary for operation can be secured for a user even when the keyboard cannot be used, so that usability of the information processing apparatus can be improved.

According to an embodiment of the present invention, when the closed state of the keyboard is detected, an inputting screen for inputting various information is started. Thus, functions necessary for operation can be secured for a user even when the keyboard cannot be used, so that usability of the information processing apparatus can be improved.

According to an embodiment of the present invention, when the opened state of the keyboard is detected, the keyboard is set in a usable state. Thus, good operability of the information processing apparatus can be ensured.

According to an embodiment of the present invention, when the opened state of the keyboard is detected, one of operating means provided to the apparatus main unit, for performing various operations, and inputting means provided to the apparatus main unit, for inputting various information, is set in an unusable state. Thus, unnecessary power consumption is prevented, and power can be saved.

According to an embodiment of the present invention, when the opened state of the keyboard is detected, a utility for making various settings on the keyboard is set in an executable state. Thus, functions necessary only when the keyboard is usable are secured, so that usability of the information processing apparatus can be improved.

According to an embodiment of the present invention, there is provided a processing program in an information processing apparatus. The information processing apparatus includes a keyboard that has a plurality of operating keys and is foldable via a hinge part, the keyboard being set in a closed state in which the operating keys are closed and in an opened state in which the operating keys are opened, and an apparatus main unit that is connected with the keyboard and performs a process corresponding to an operation of the operating keys on the keyboard. The processing program includes the steps of detecting the closed state and the opened state of the keyboard, and controlling operation of one of the apparatus main unit and the keyboard according to a result of detection in the detecting step.

Thus, appropriate operation can be performed according to a state of use of the keyboard, and usability of the information processing apparatus can be improved.

BRIEF DESCRIPTION OF THE DRAWINGS

These and other objects of the invention will be seen by reference to the description, taken in connection with the accompanying drawings, in which.

DETAILED DESCRIPTION OF PREFERRED EMBODIMENTS

An information processing apparatus and a processing program in the information processing apparatus according to embodiments of the present invention will hereinafter be described with reference to the accompanying drawings.

Incidentally, the information processing apparatus according to the embodiment of the present invention is widely applicable to various information processing apparatuses having a keyboard, such for example as personal computers and other information processing apparatuses, PDAs (Personal Digital Assistants), network terminals, portable information terminals, and workstations. The processing program according to the embodiment of the present invention is widely applicable to processing programs in these various information processing apparatuses.

Figure 1:
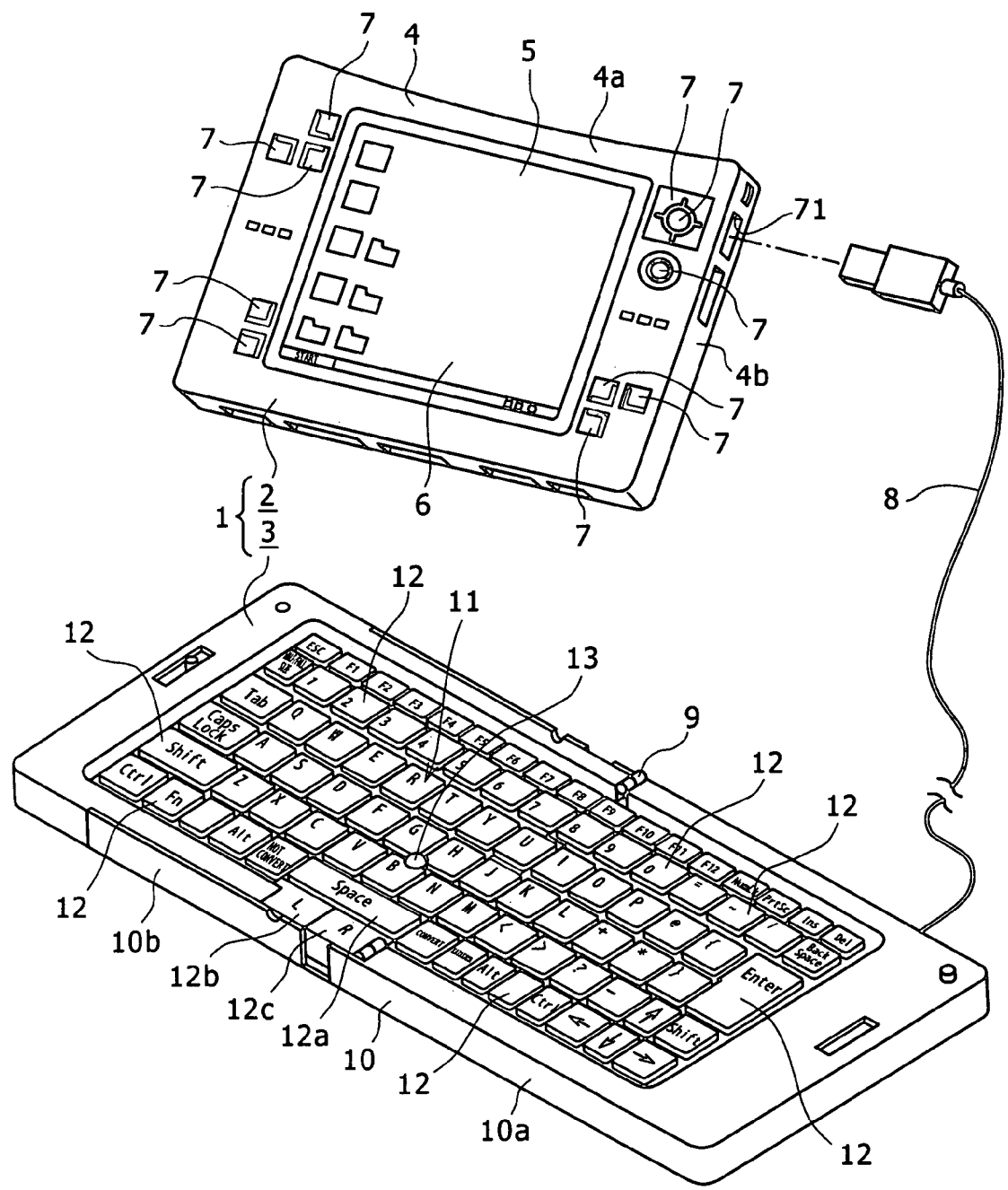
FIG. 1, which shows the best mode of the present invention together with FIGS. 2 to 13, is a perspective view of an information processing apparatus.

The information processing apparatus 1 has an apparatus main unit 2 and a keyboard 3 connected to the apparatus main unit 2 (see FIG. 1).

Figure 2:
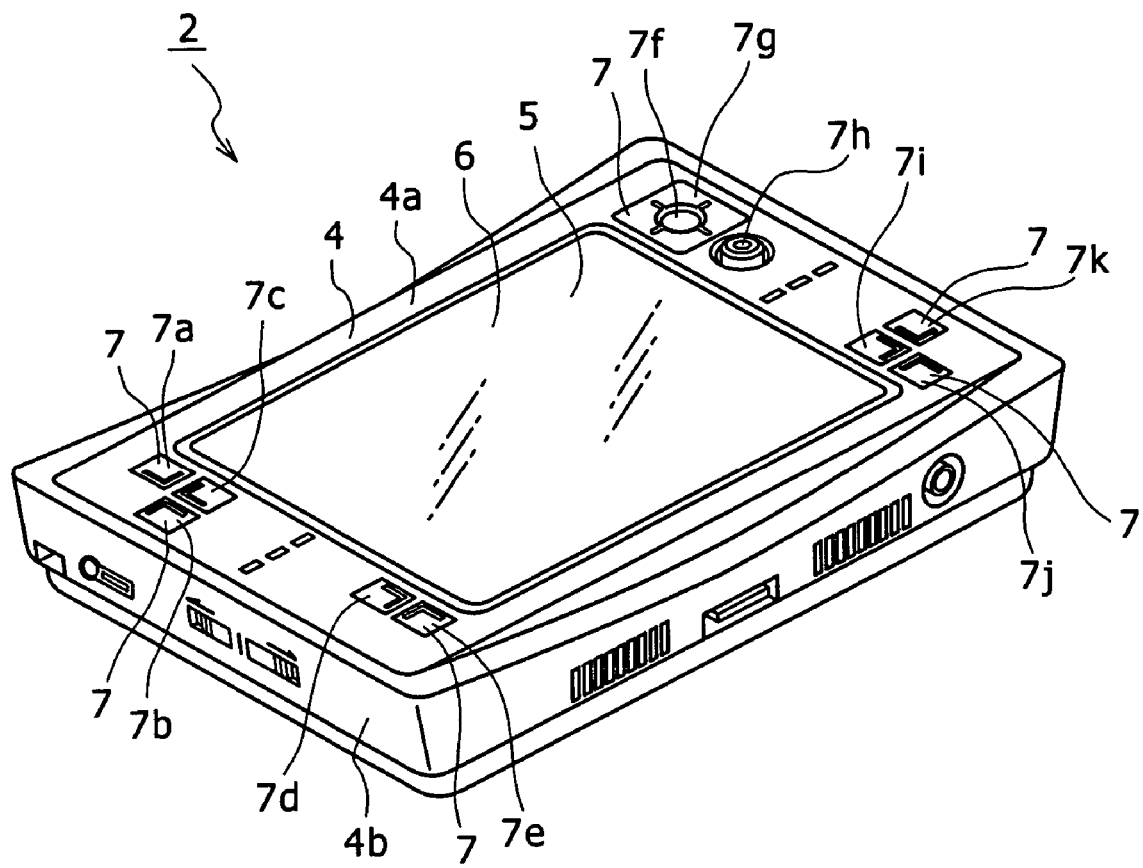
FIG. 2 is a perspective view of an apparatus main unit.

The apparatus main unit 2 is formed by arranging required parts on a casing 4 (see FIG. 1 and FIG. 2). The casing 4 is formed in a flat, rectangular shape that is long sideways, for example. A display 5, for example a liquid crystal panel is formed in a front surface 4a of the casing 4. The display 5 displays a display screen 6 having various information (see FIG. 2).

The display 5 of the information processing apparatus 1 is a touch panel (tablet). Various operations such as selecting operations, input operations, and the like can be performed by tapping a predetermined position of the display screen 6 displayed on the display 5 with a finger or a special input pen (stylus) not shown in the figure.

The apparatus main unit 2 has a main unit device section 100 and a connecting device section (interface device section) 200 as hardware configuration.

Figure 3:
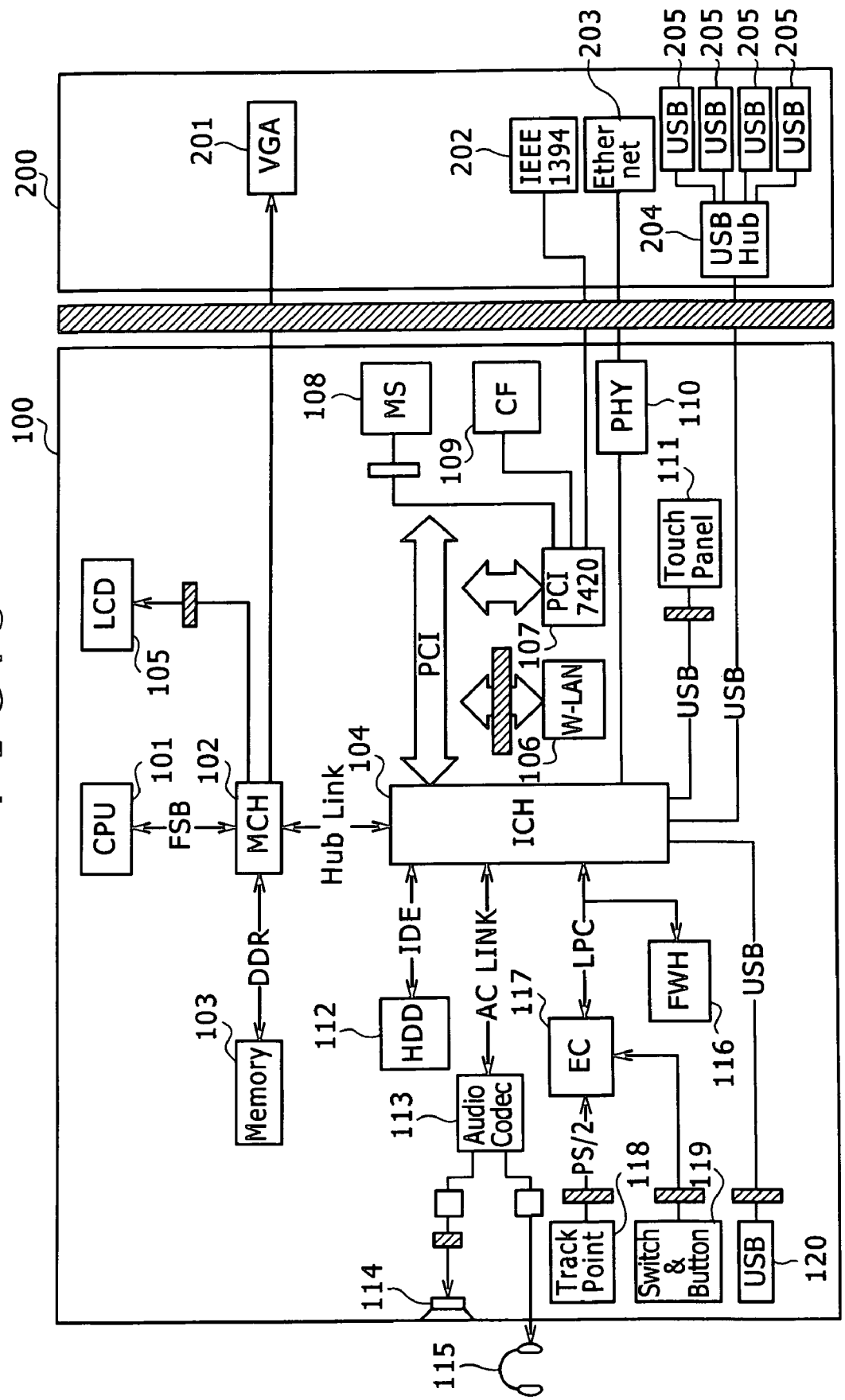
FIG. 3 is a block diagram showing an example of hardware configuration of the apparatus main unit.

FIG. 3 shows an example of hardware configuration of the information processing apparatus.

A configuration within the main unit device section 100 will first be described.

A CPU 101 as a control center is connected to a control device 102 via a bus (FSB: Front Side Bus). The control device 102 controls a main memory 103 and performs control related to a graphic function, and has a main role of quickly processing a large amount of data. The control device 102 is referred to as a "north bridge" in an AT compatible. The control device 102 shown in this example is connected with the CPU 101, the main memory 103, a control device 104, and a graphic display device 105 such as a liquid crystal display device or the like (the same as the above-mentioned display 5).

The control device 104 mainly controls a control device for a user interface and the like, and performs device bus linking and the like. The control device 104 is referred to as a "south bridge" in an AT compatible. A "PCI to ISA bridge" has a role as a bridge between a bus (PCI: Peripheral Component Interconnect bus) and a low-speed bus (ISA: Industry Standard Architecture bus or the like), and has a function of an ISA controller, an IDE (Integrated Drive Electronics) controller, and the like.

The bus (PCI bus) is connected with a wireless LAN (W-LAN) as a wireless communication device 106 and a device 107 for connection to and control of an external memory and an external device. A controlling device 108 and a controlling device 109 are provided as the external memory. The controlling device 108 reads and writes data on a semiconductor memory device detachable from the main unit device section 100, for example a stick-shaped memory medium. The controlling device 109 is for a card-shaped storage medium. A device 107 has a function of an interface (for example "IEEE 1394" defining specifications for hardware to add a serial device to a computer) for connection with an external device.

The control device 104 is connected with a connecting device 110 for a LAN (Local Area Network), and a USB (Universal Serial Bus) port of the control device 104 is connected with an inputting device 111 using a touch panel or the like.

A drive device using a magnetic disk or an optical disk, for example, is used as an auxiliary storage device 112. In this example, a drive device using a high-capacity storage medium such as a hard disk or the like is used as the auxiliary storage device 112. The auxiliary storage device 112 is connected to the control device 104 (the IDE controller within the control device 104).

An audio signal processing unit (Audio Codec) 113 connected to the control device 104 sends an audio signal obtained by digital-to-analog conversion to a speaker 114 and headphones 115, for example, to output sound. In addition, the audio signal processing unit 113 in a device form having a microphone digitizes audio input data, for example.

A storage device 116 stores a control program for operating the computer, and the like. The storage device 116 is connected to the control device 104 and a control device 117 by LPC (Low Pin Count: serial bus) or the like.

The control device 117 is a general-purpose device for controlling various signals. An EC (Embedded Controller), for example, is used as the control device 117. The control device 117 performs control for a function of a keyboard controller, power supply control of a system, an added function of the system, and the like (a microcomputer is incorporated in a portable type device and the like). Incidentally, a method of controlling the computer can be varied by changing a control program within the storage device 116.

An operating device 118 (a pointing device 7h to be described later) forming a stick type pointing device (a track point or the like) is connected to a port (PS/2 (Personal System/2) port or the like) of the control device 117. A signal from an operating unit 119 including switches, operating buttons, and the like provided on the main unit device section 100 is sent to the control device 104.

A USB connector (a connecting port 71 to be described later) is provided as a connecting unit 120 for directly connecting an external device to the main unit device section 100. The connecting unit 120 is connected to the control device 117.

Incidentally, a power supply unit not shown in the figure is supplied with a commercial power supply voltage from an AC adapter, or direct-current power from a battery using a secondary battery, a fuel cell, or the like. For example, the EC (control device 117) detects states of connection and loading of the AC adapter, the battery, and the like, and retains various management information including information on a remaining amount of charge of the battery and the like.

A configuration of the connecting device section 200 will next be described.

The main unit device section 100 is connected to the connecting device section 200 via connecting means such as a connector or the like so that signal transmission to and from an external device not shown in the figure is performed.

A connector unit 201 for connecting an external display device by a VGA (Video Graphics Array) connector or the like is connected to the control device 102 within the main unit device section 100. Thus an image signal and the like are output to the external display device.

A connector unit 202 for connecting an external device or the like compliant with the "IEEE 1394" standard is connected to the device 107 within the main unit device section 100. A connector unit 203 for connecting a LAN cable or the like is connected to the device 110 within the main unit device section 100.

A USB hub is used as a line concentrating device 204 connected to the control device 104 within the main unit device section 100. In this example, four USB connectors 205, 205, . . . are provided in the connecting device section 200. The USB connectors 205, 205, . . . are connected to the line concentrating device 204 (USB hub).

A plurality of operating buttons 7, 7, . . . are provided at predetermined positions of the casing 4 (see FIG. 1 and FIG. 2). The operating buttons 7, 7, . . . function as operating means for performing various operations on the display screen 6 displayed on the display 5 or input means for inputting various information to the display screen 6.

Provided as operating buttons 7, 7, . . . are, for example, a center button 7a, a left button 7b, a right button 7c, a zoom button 7d, a rotation button 7e, an enter button 7f, a cursor key 7g, a pointing device 7h, a function selecting button 7i, a starting button 7j, and a brightness changing button 7k.

The center button 7a, the left button 7b, and the right button 7c correspond to respective buttons of a mouse. The zoom button 7d enlarges or reduces the display screen 6 displayed on the display 5, that is, changes resolution of the display screen 6. The rotation button 7e rotates the display screen 6 by 90°. The enter button 7f corresponds to an enter key of the keyboard, and is a button for performing or confirming an operation. The cursor key 7g for example moves a cursor displayed on the display 5 in a direction of up, down, right, or left. The pointing device 7h for example moves a pointer displayed on the display 5. The function selecting button 7i is a button for changing the volume of output sound, changing output to an external display, or the like. The starting button 7j starts specific software. The brightness changing button 7k changes brightness of the display 5.

As shown in FIG. 1 and FIG. 2, the information processing apparatus 1 has the enter button 7f disposed at a center of the cursor key 7g. It is thus possible to reduce space and therefore miniaturize the information processing apparatus 1 as compared with a case where the enter button 7f and the cursor key 7g are separated at respective different positions distant from each other.

In addition, since the pointing device 7h is disposed in the vicinity of the enter button 7f and the cursor key 7g, an amount of hand or finger movement is small when the pointing device 7h, the enter button 7f, and the cursor key 7g are used consecutively or with high frequency. Therefore excellent operability can be ensured.

The information processing apparatus 1 is provided with a connecting port 71 for connecting the keyboard 3 on a side 4b of the casing 4 (see FIG. 1). The connecting port 71 is for example a USB port.

The keyboard 3 is connected to the connecting port 71 of the apparatus main unit 2 by a connecting cable 8 (see FIG. 1).

Figure 4:
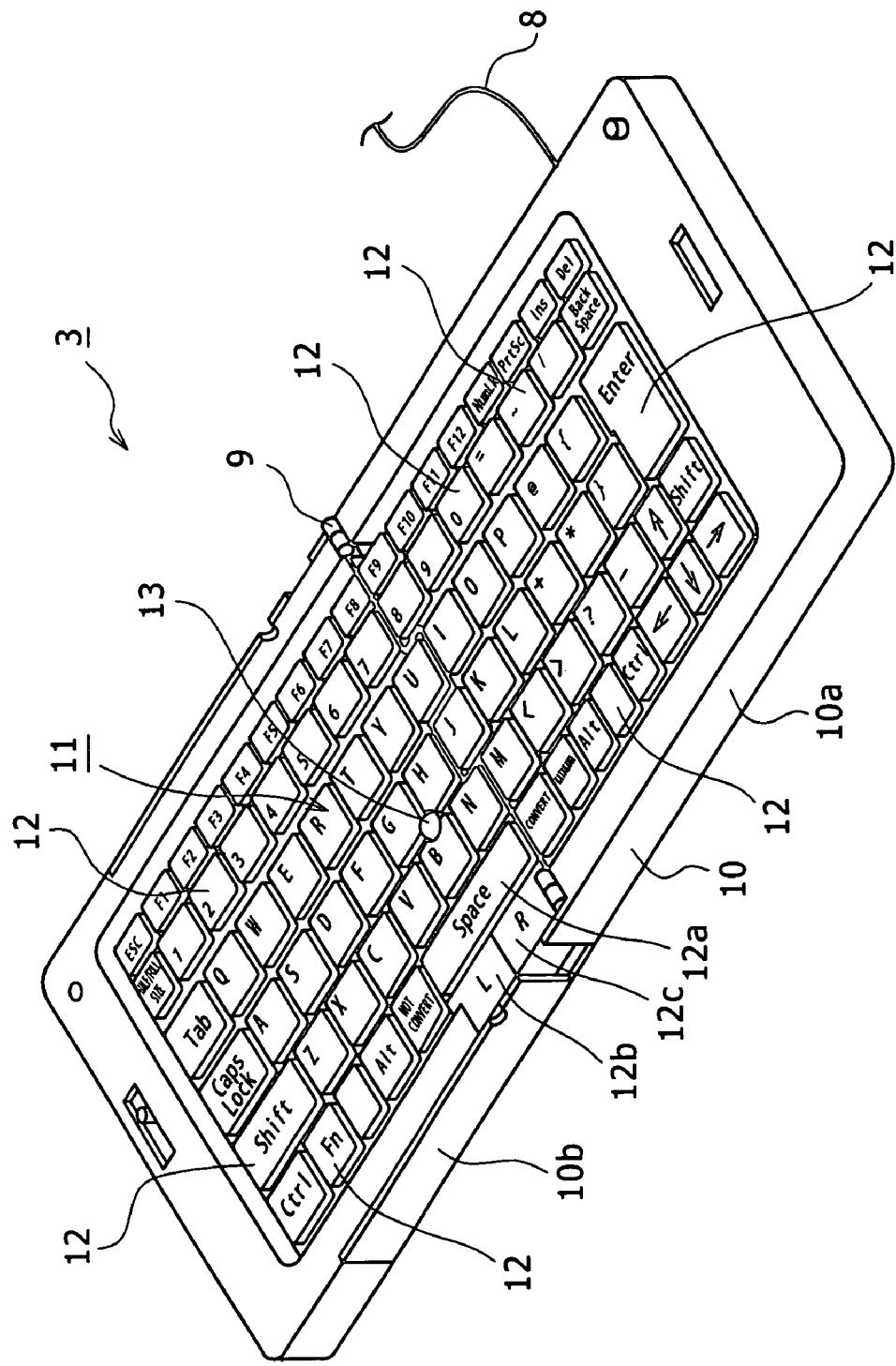
FIG. 4 is an enlarged perspective view showing an opened state of a keyboard.
Figure 5:
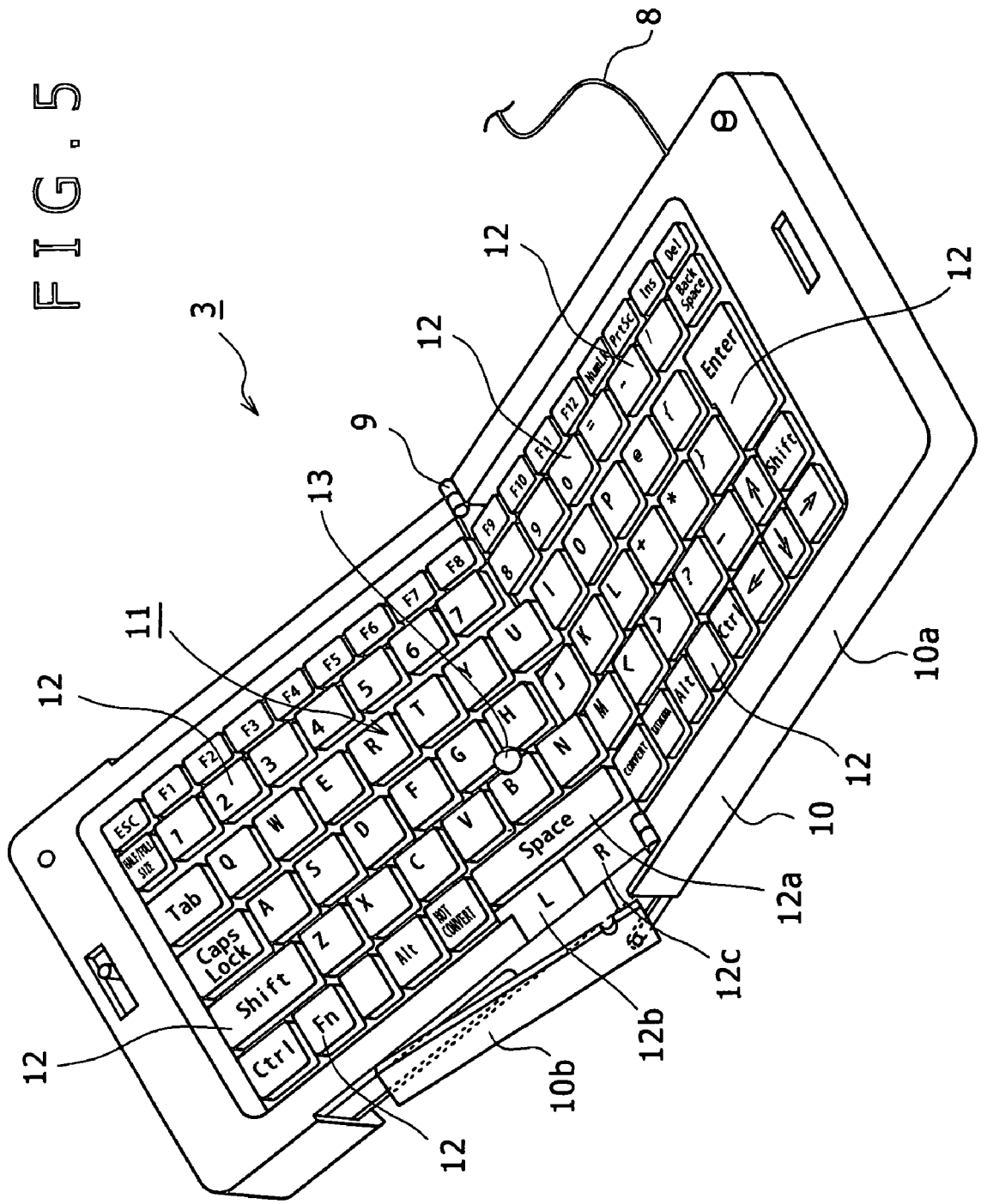
FIG. 5 is an enlarged perspective view showing a state in a process of opening or closing the keyboard.
Figure 6:
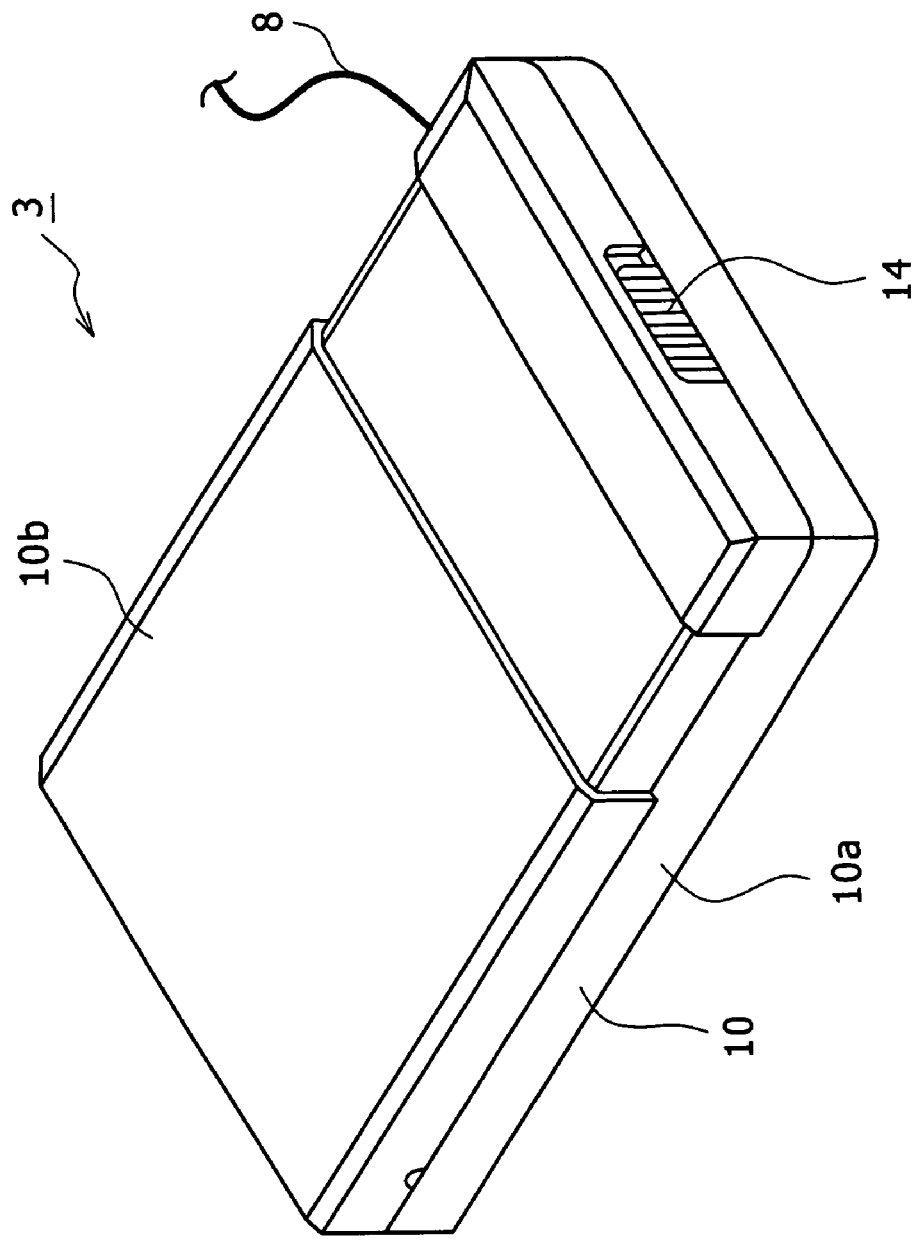
FIG. 6 is an enlarged perspective view showing a closed state of the keyboard.

The keyboard 3 has a hinge part 9 at a central part in a lateral direction, and can be folded double via the hinge part 9 (see FIGS. 4 to 6). The keyboard 3 has a frame part 10 and an operation part 11 disposed inside the frame part 10.

The frame part 10 is formed by a fixed frame 10a and a slide frame 10b. The slide frame 10b is slid relative to the operation part 11 at a time of opening and closing the keyboard 3.

The operation part 11 is closed when the keyboard 3 is in a folded and closed state. The operation part 11 is opened and operable when the keyboard 3 is in an opened state.

A plurality of operating keys 12, 12, . . . are arranged on the operation part 11. Provided as the operating keys 12, 12, . . . are, for example, an escape key for returning to a previous stage of operation, function keys (F1 to F12) for performing predetermined functions, character input keys (alphabet keys) for inputting characters, a backspace key and a delete key for deleting an input character, numeric keys enabling input of numbers, an enter key for confirming an input and the like, a caps lock key for converting input letters, a shift key used in combination with another key to perform a specific function, control keys and Alt keys, a space key for providing a space and the like, and a cursor key for moving a cursor.

A left click key 12b and a right click key 12c are arranged directly under the space key 12a of the operation part 11. A mouse pointer 13 is disposed at a position surrounded by predetermined character input keys above the space key 12a. The mouse pointer 13 is for example disposed between keys for inputting alphabetical letters "G," "H," and "B" of the character input keys.

The left click key 12b and the right click key 12c have the same function as the left button 7b and the right button 7c, respectively, provided on the apparatus main unit 2. The mouse pointer 13 has the same function as the pointing device 7h provided on the apparatus main unit 2.

A lock knob 14 is provided on a side of the keyboard 3. The lock knob 14 is operated in the closed state of the keyboard 3 to lock the closed state and release the locking.

With the information processing apparatus 1, as described above, the left click key 12b, the right click key 12c, and the mouse pointer 13 having the respective functions of a mouse are arranged on the keyboard 3. It is not necessary to use a mouse separate from the keyboard 3, and therefore it is not necessary to carry a mouse together with the apparatus main unit 2 and the keyboard 3, so that usability can be improved.

Figure 7:
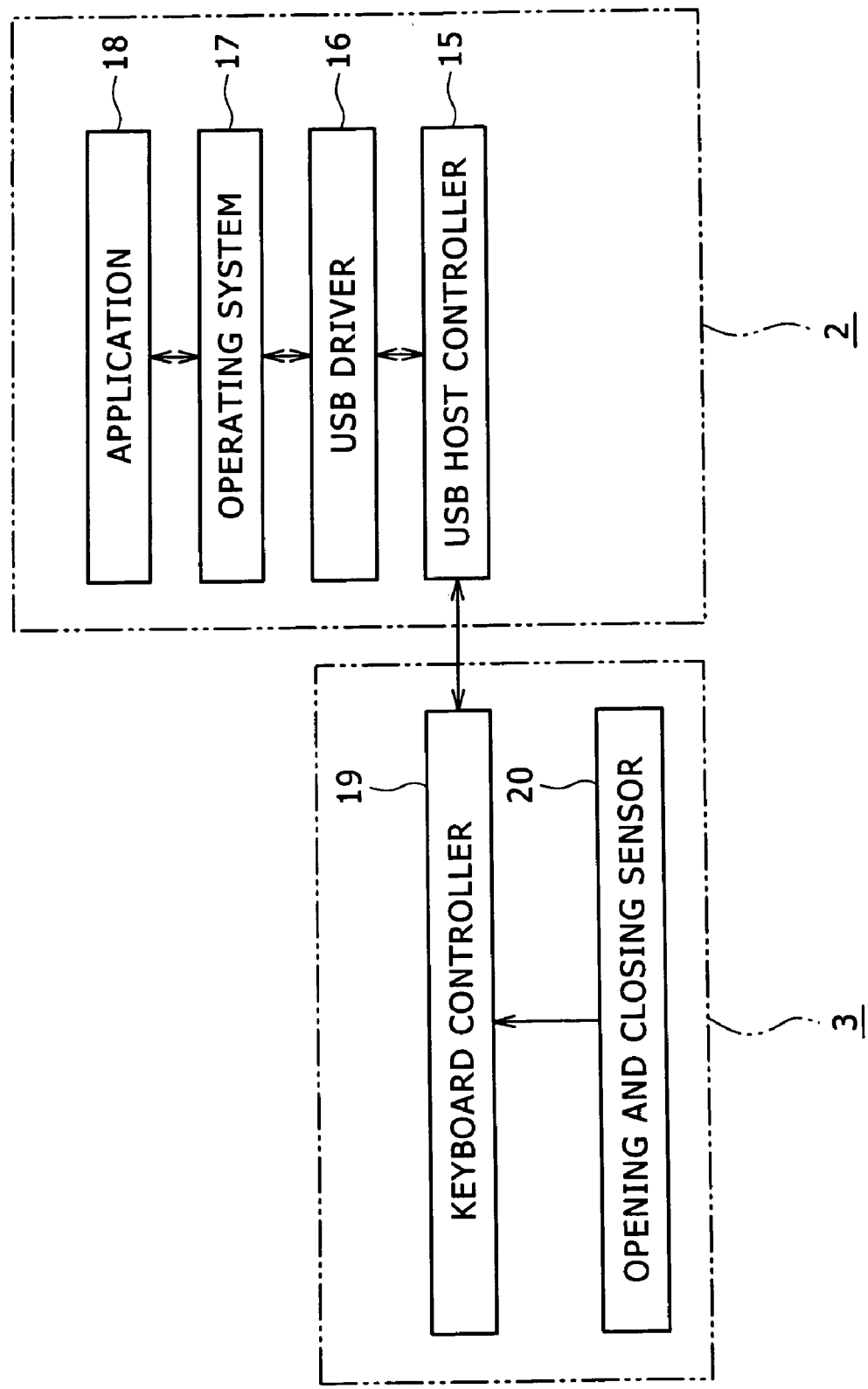
FIG. 7 is a conceptual diagram showing an internal configuration of the information processing apparatus.

An internal configuration of the information processing apparatus 1 will be illustrated in the following (see FIG. 7).

The apparatus main unit 2 incorporates a USB host controller 15, a USB driver 16, an operating system (OS) 17, and an application 18.

The USB host controller 15 is means for controlling the apparatus main unit 2 on the basis of a message between the apparatus main unit 2 and the keyboard 3. The USB host controller 15 passes a message received from the keyboard 3 to the USB driver 16, and passes a message received from the USB driver 16 to the keyboard 3.

The USB driver 16 is interposed between the USB host controller 15 and the operating system 17. The USB driver 16 has a function of passing a message received from the USB host controller 15 to the operating system 17, and passing a message received from the operating system 17 to the USB host controller 15.

The operating system 17 has a function of controlling the whole of the information processing apparatus 1, and controls operation of the application 18, for example.

The application 18 is means for performing each operation process in the information processing apparatus 1. For example, the application 18 performs a process for predetermined software, and issues a message to perform a predetermined process to the keyboard 3.

The keyboard 3 incorporates a keyboard controller 19 and an opening and closing sensor 20.

The keyboard controller 19 is means for controlling the keyboard 3 on the basis of a message received from the apparatus main unit 2 or the opening and closing sensor 20.

The opening and closing sensor 20 is means for detecting an opened or closed state of the keyboard 3 at all times. The opening and closing sensor 20 notifies a message based on a result of the detection to the keyboard controller 19. As the opening and closing sensor 20, a tactile switch type or a magnetic force type is used, for example.

Description will next be made of an example of a control process performed at a time of detection of the opening or closing of the keyboard 3 (see FIGS. 8 to 13). As described above, the opening and closing sensor 20 in the information processing apparatus 1 detects the opened or closed state of the keyboard 3 at all times. The apparatus main unit 2 and the keyboard 3 perform the following processes according to a result of the detection. Incidentally, the detection of the opened or closed state of the keyboard 3 by the opening and closing sensor 20 is a detecting step, and each process performed on the basis of a result of the detection in the detecting step is a control step.

Figure 8:
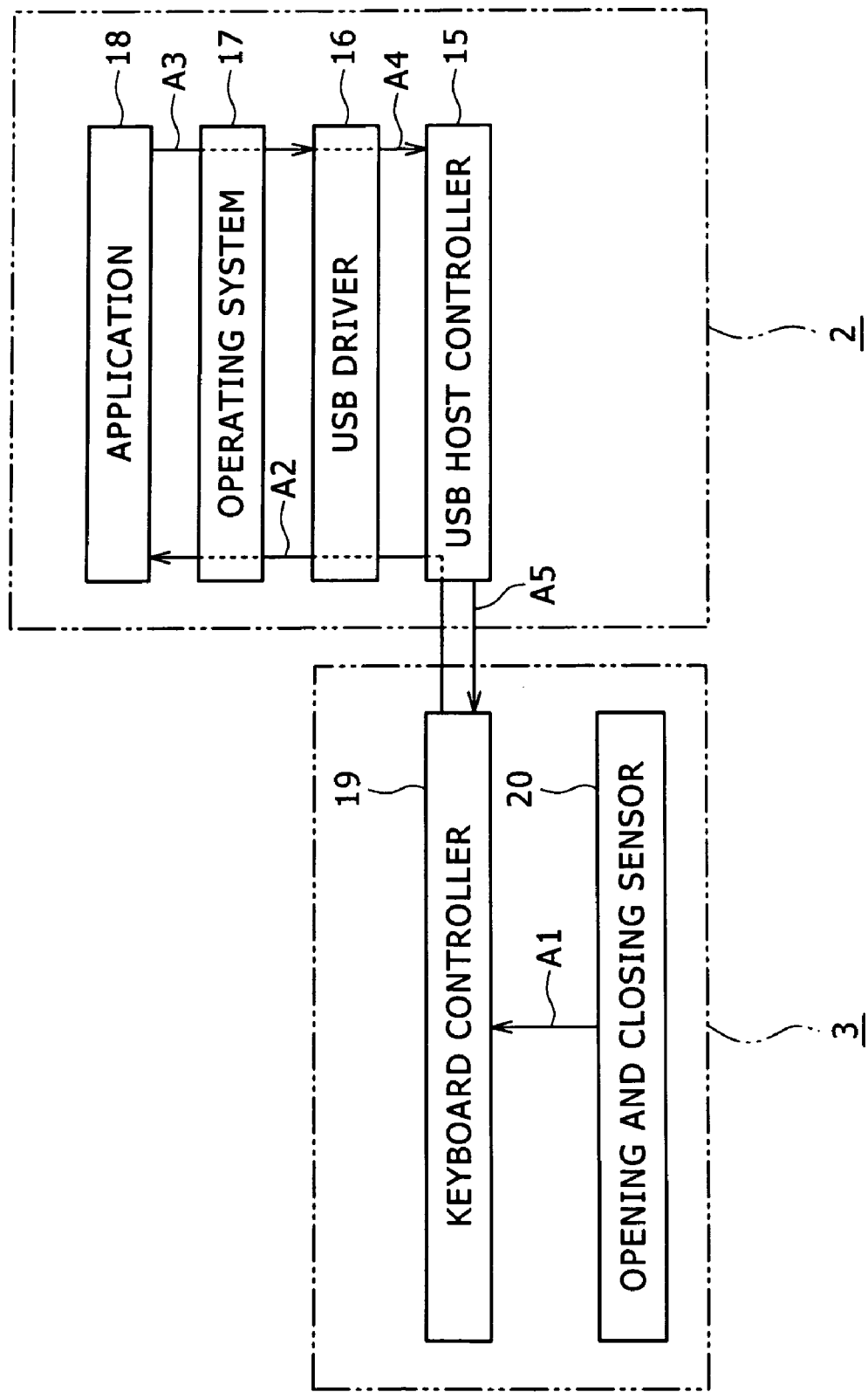
FIG. 8 is a conceptual diagram representing a first process example.

A first example of the process will be described (see FIG. 8).

When the opening and closing sensor 20 detects the closed state of the keyboard 3, a message indicating the closed state according to the detection result is issued to notify the keyboard controller 19 of the closed state (A1).

When the keyboard controller 19 receives the message from the opening and closing sensor 20, a message corresponding to the received message is issued from the keyboard controller 19, and the issued message is supplied to the application 18 via the USB host controller 15, the USB driver 16, and the operating system 17 (A2).

The application 18 issues a message to set a low power consumption mode to the USB driver 16 via the operating system 17 (A3). Receiving the message, the USB driver 16 supplies a message corresponding to the received message to the USB host controller 15 (A4).

The USB host controller 15 supplies a message to change to the low power consumption mode to the keyboard controller 19 (A5). Receiving this message, the keyboard controller 19 sets the low power consumption mode in which power supply to the keyboard 3 is limited.

Incidentally, when the keyboard 3 is set in the low power consumption mode as described above, a low power consumption mode such as a non-operating state may be set simultaneously in the apparatus main unit 2.

By setting the keyboard 3 in the low power consumption mode when the keyboard 3 is in the closed state, as described above, it is possible to prevent unnecessary power consumption and thus save power. It is particularly effective when the information processing apparatus 1 is driven by a battery.

Figure 9:
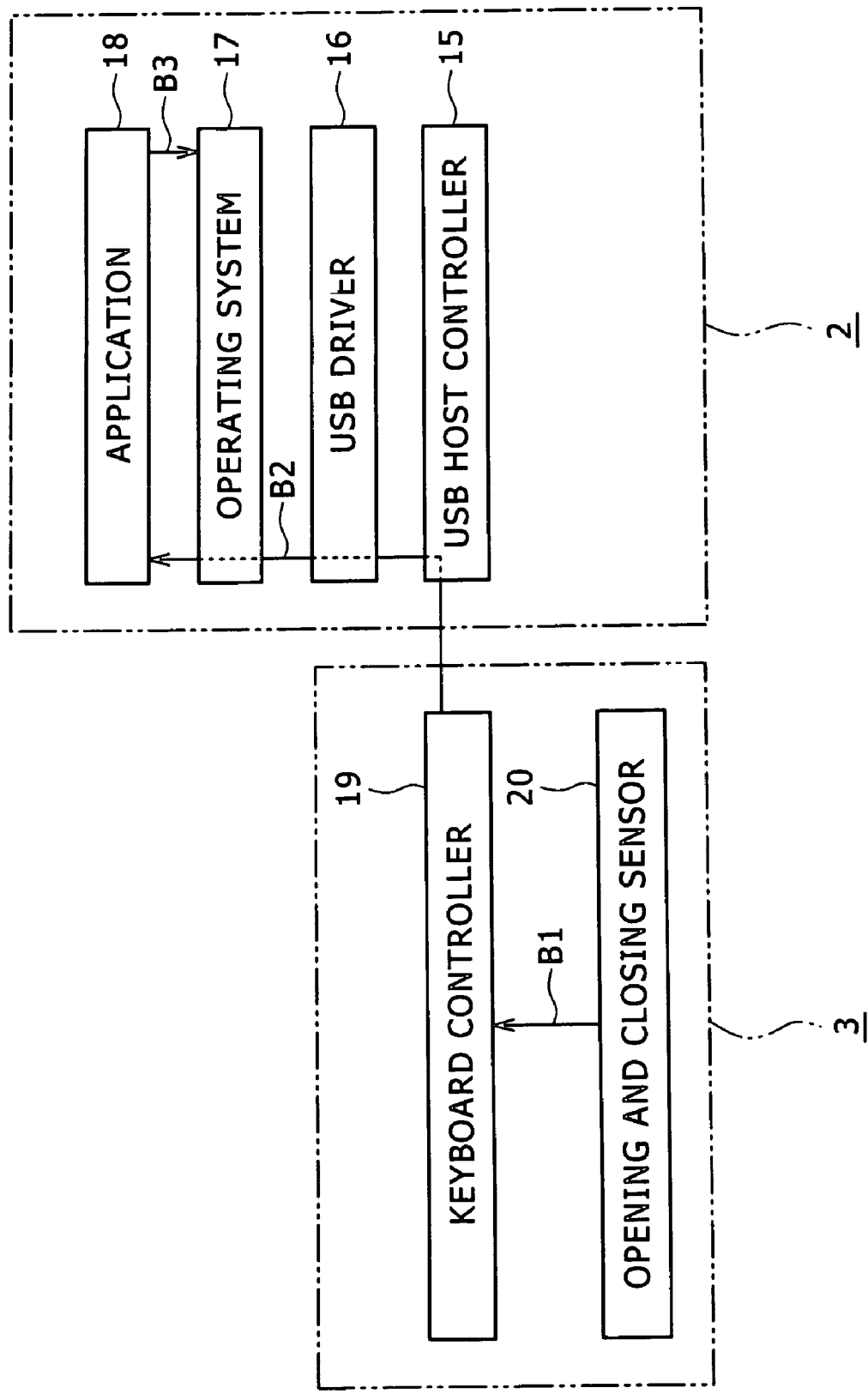
FIG. 9 is a conceptual diagram representing a second process example.

A second process example will be described (see FIG. 9).

When the opening and closing sensor 20 detects the closed state of the keyboard 3, a message indicating the closed state according to the detection result is issued to notify the keyboard controller 19 of the closed state (B1).

When the keyboard controller 19 receives the message from the opening and closing sensor 20, a message corresponding to the received message is issued from the keyboard controller 19, and the issued message is supplied to the application 18 via the USB host controller 15, the USB driver 16, and the operating system 17 (B2).

The application 18 supplies the operating system 17 with a performing message to enable performance of the functions of the predetermined operating buttons 7, 7, and the like provided on the apparatus main unit 2 (B3). Receiving this message, the operating system 17 enables the performance of the functions of the predetermined operating buttons 7, 7, ... and the like. Incidentally, the predetermined operating buttons 7, 7, ... in the above description are for example the operating buttons 7, 7, ... having the same functions as the operating keys 12, 12, ... provided on the keyboard 3, and are the left button 7b, the right button 7c, the enter button 7f, the cursor key 7g, the pointing device 7h, and the like.

By enabling the functions of the predetermined operating buttons 7, 7, ... when the keyboard 3 is in the closed state, as described above, functions necessary for operation can be secured for a user even when the keyboard 3 cannot be used, so that usability of the information processing apparatus 1 can be improved.

Figure 10:
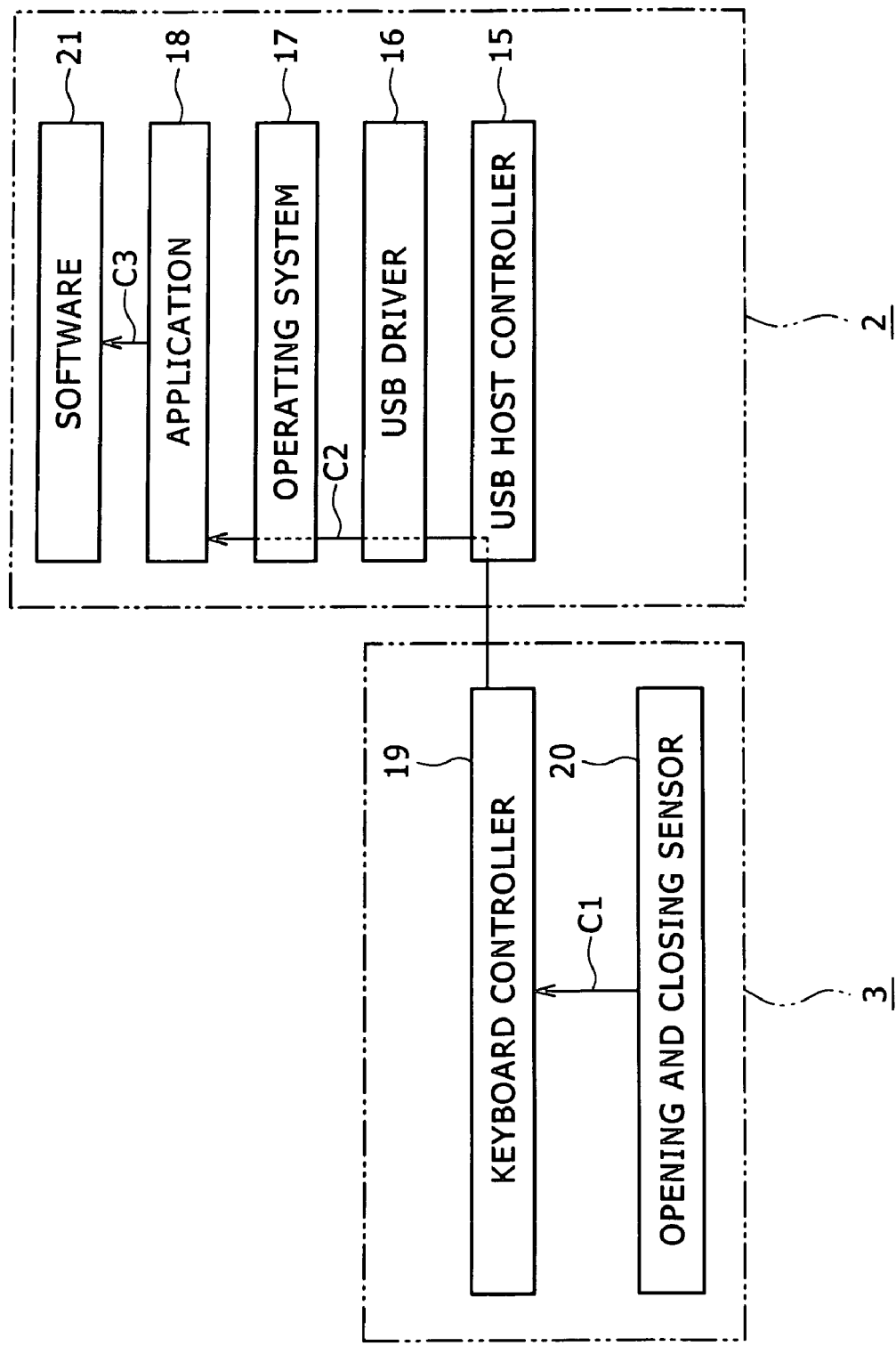
FIG. 10 is a conceptual diagram representing a third process example.
Figure 11:
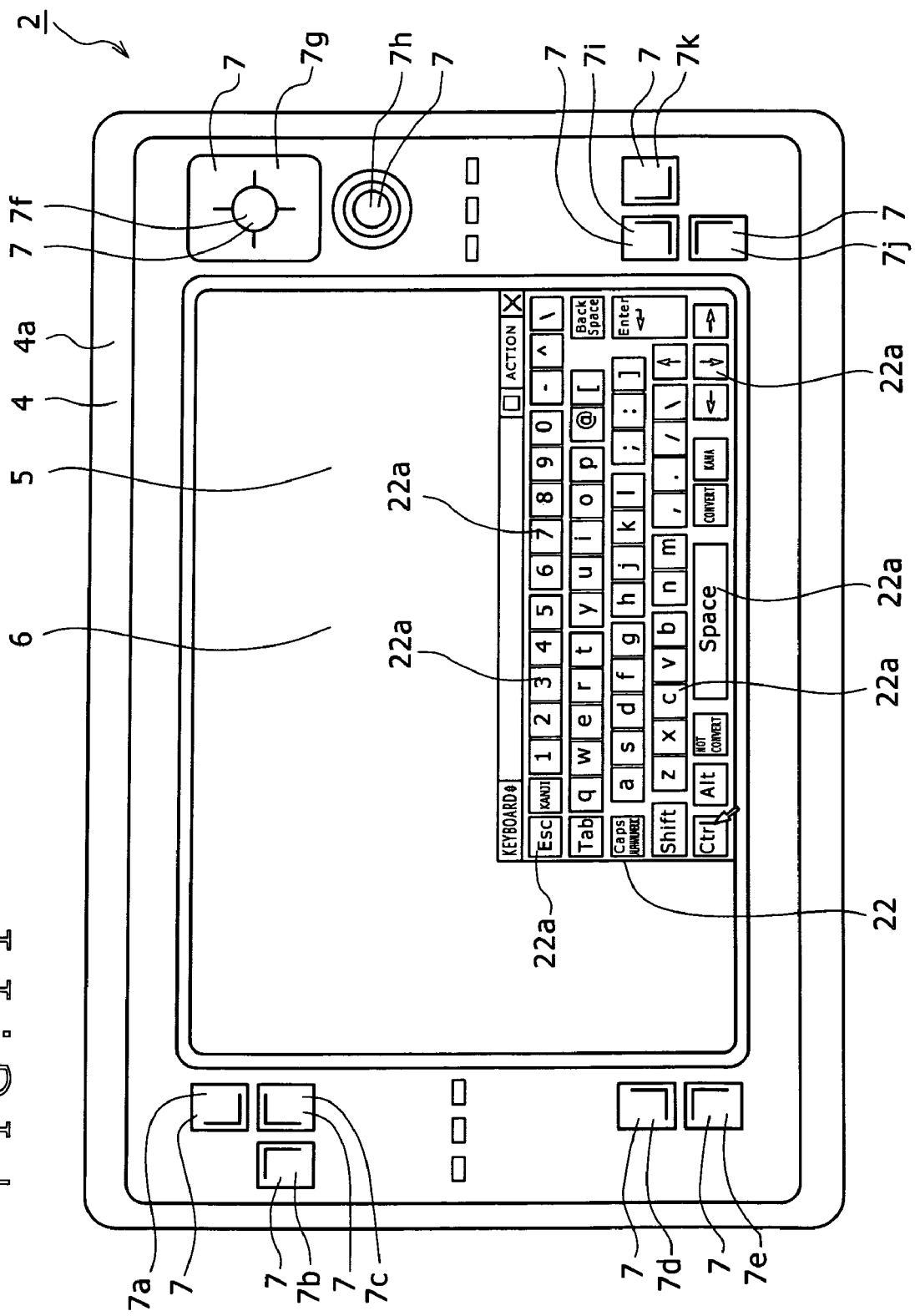
FIG. 11 is an enlarged front view of an input screen displayed in the third process example.
Figure 12:
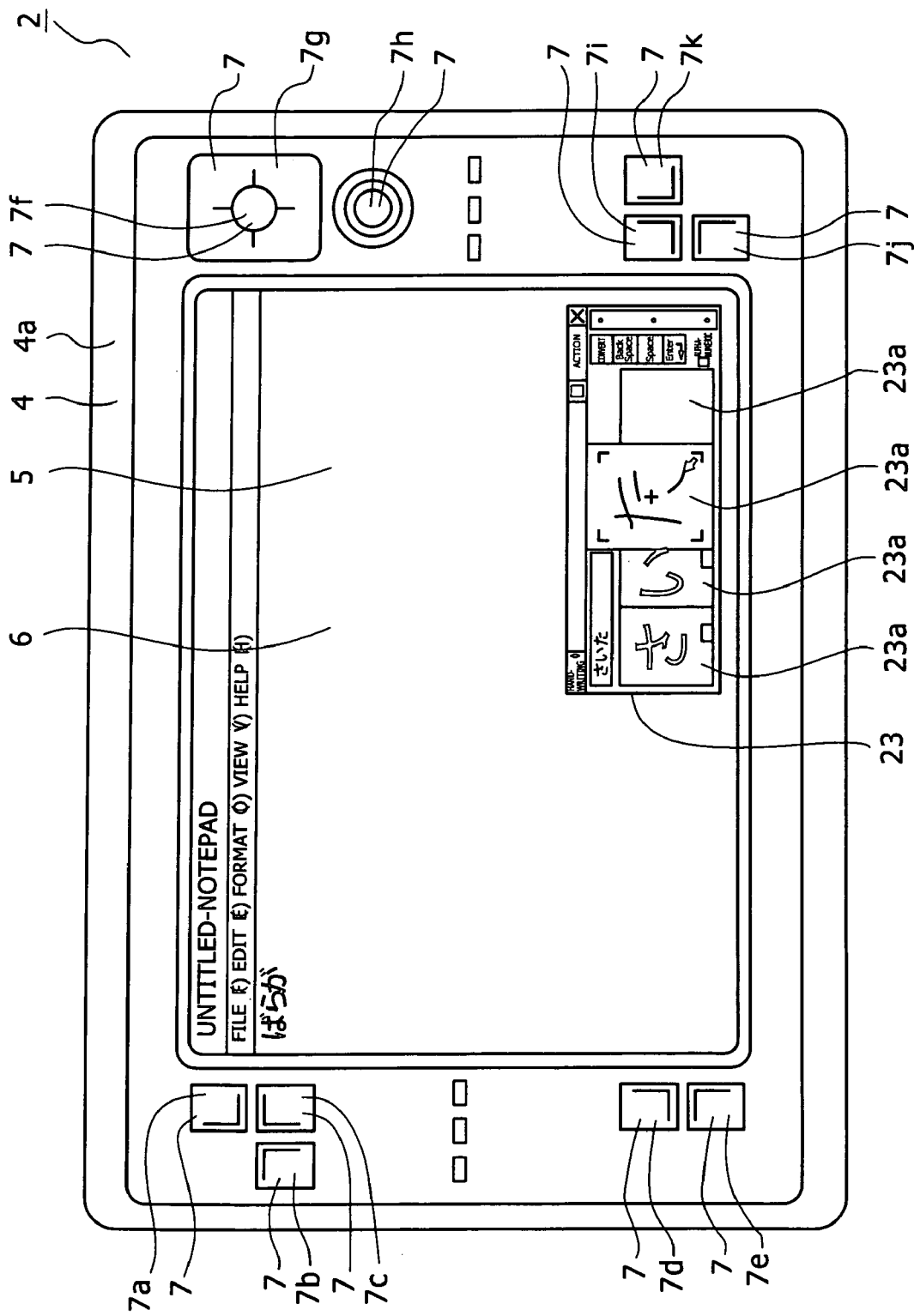
FIG. 12 is an enlarged front view of another input screen displayed in the third process example.

A third process example will be described (see FIGS. 10 to 12).

When the opening and closing sensor 20 detects the closed state of the keyboard 3, a message indicating the closed state according to the detection result is issued to notify the keyboard controller 19 of the closed state (C1).

When the keyboard controller 19 receives the message from the opening and closing sensor 20, a message corresponding to the received message is issued from the keyboard controller 19, and the issued message is supplied to the application 18 via the USB host controller 15, the USB driver 16, and the operating system 17 (C2).

The application 18 starts predetermined software 21 incorporated in the apparatus main unit 2 on the basis of the received message. Incidentally, the predetermined software 21 in the above description is for example software for starting input screens 22 and 23 or the like displayable on the display screen 6 as shown in FIG. 11 and FIG. 12.

The input screen 22 is a screen referred to as a so-called software keyboard having a plurality of operating buttons 22a, 22a, .... Various processes such as a character inputting process and the like can be performed by tapping the buttons 22a, 22a, ... with a finger or a special input pen.

The input screen 23 has a plurality of input frame areas 23a, 23a .... Characters and the like can be input by handwriting with a special input pen or the like in the input frame areas 23a, 23a, ...

By enabling the starting of the above-described input screens 22 and 23 when the keyboard 3 is in the closed state, as described above, functions necessary for operation can be secured for a user even when the keyboard 3 cannot be used, so that usability of the information processing apparatus 1 can be improved.

Figure 13:
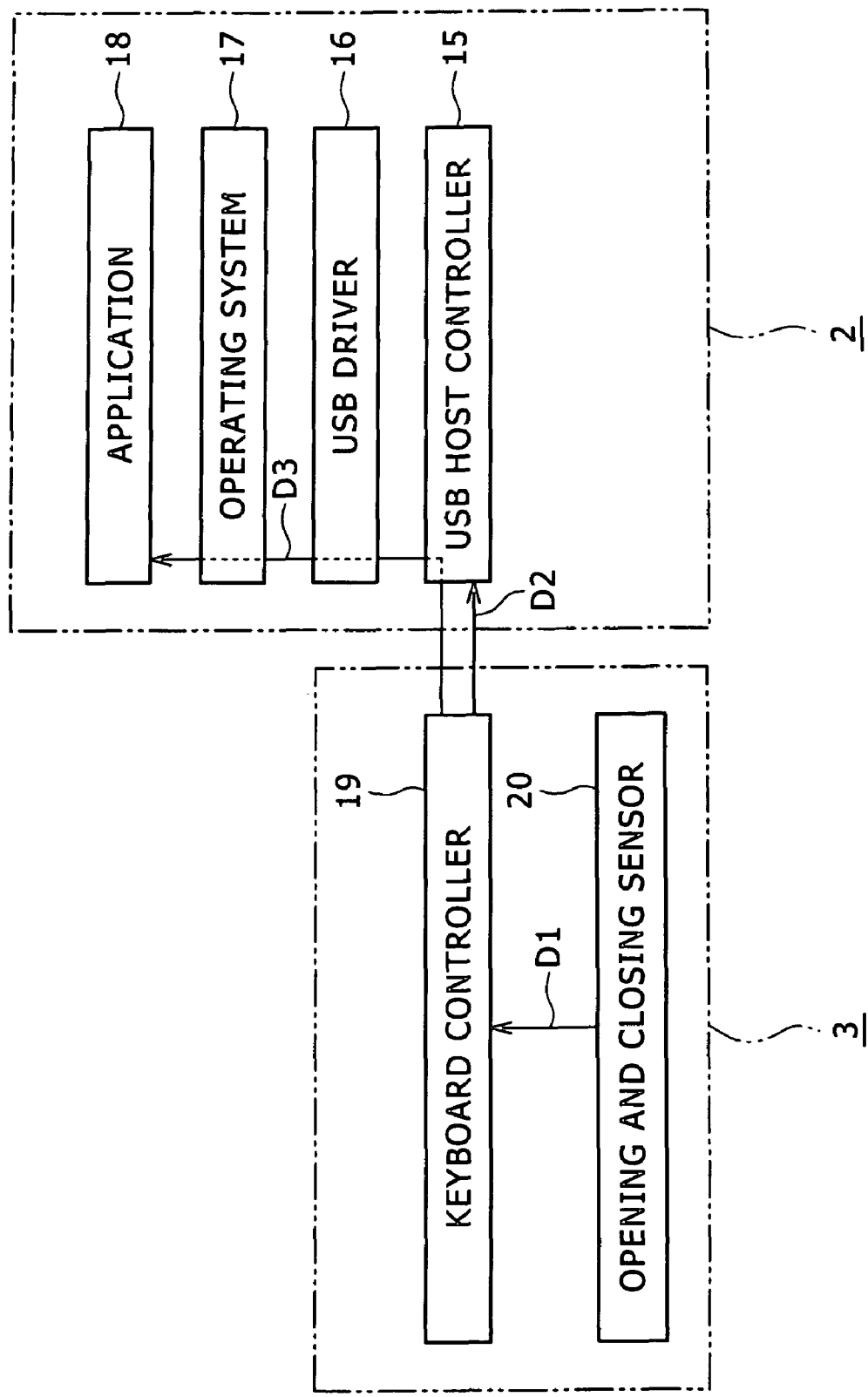
FIG. 13 is a conceptual diagram representing a fourth process example.

A fourth process example will be described (see FIG. 13).

When the opening and closing sensor 20 detects the opened state of the keyboard 3, a message indicating the opened state according to the detection result is issued to notify the keyboard controller 19 of the opened state (D1).

When the keyboard controller 19 receives the message from the opening and closing sensor 20, a request message to enable use of the keyboard 3 which message corresponds to the received message is issued from the keyboard controller 19, and the issued message is supplied to the USB host controller 15 (D2).

When the message is supplied to the USB host controller 15, the low power consumption mode of the keyboard 3 is cancelled, and the keyboard 3 is set in a usable state.

At the same time, when the keyboard controller 19 receives the message from the opening and closing sensor 20, a message corresponding to the received message is issued from the keyboard controller 19, and the issued message is supplied to the application 18 via the USB host controller 15, the USB driver 16, and the operating system 17 (D3).

On the basis of the message supplied to the application 18, the application 18 issues a message to enable starting of software and the like used as the keyboard 3 is used.

By enabling use of the keyboard 3 when the keyboard 3 is brought into the opened state as described above, excellent operability of the information processing apparatus 1 can be ensured.

Incidentally, the following process may be performed when the opened state of the keyboard 3 is detected.

For example, it is possible to perform a process of disabling operation or the like of functions that are also provided to the keyboard 3 among the functions provided to the apparatus main unit 2 when the keyboard 3 is opened. Specifically, there are a process of disabling operation of the left button 7b, the right button 7c, the enter button 7f, the cursor key 7g, the pointing device 7h, and the like, and a process of disabling starting of the input screens 22 and 23 or the like and limiting power to means for performing the functions of the input screens 22 and 23 or the like.

By thus disabling the operation or the like of the functions that are also provided to the keyboard 3 among the functions provided to the apparatus main unit 2 and limiting the power, unnecessary power consumption is prevented, and therefore power saving can be achieved. This is particularly effective when the information processing apparatus 1 is driven by a battery.

As another process, a process of setting a utility for making various settings on the keyboard 3 in an executable state can be performed.

By thus performing a process of setting a utility for making various settings on the keyboard 3 in an executable state, functions necessary only when the keyboard 3 is usable are secured, and therefore usability of the information processing apparatus 1 can be improved.

As described above, the information processing apparatus 1 detects the closed or opened state of the keyboard 3, and controls the operation of the apparatus main unit 2 or the keyboard 3 according to a result of the detection. Therefore, appropriate operation according to a state of use of the keyboard 3 can be performed, and usability of the information processing apparatus 1 can be improved.

The specific shapes and structures of the parts illustrated in the foregoing best mode each represent a mere example of embodiment in carrying out the present invention, and are not to be construed as restrictive of the technical scope of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
   a keyboard that has a plurality of operating keys and is foldable via a hinge part, said keyboard being set in a closed state in which the operating keys are closed and in an opened state in which the operating keys are opened; and
   an apparatus main unit that is connected with the keyboard and performs a process corresponding to an operation of the operating keys on the keyboard, the apparatus main unit including a processor and a display screen;
   wherein operation of one of the apparatus main unit and the keyboard is controlled according to the closed state and the opened state of the keyboard,
   the processor enables starting of software for using the keyboard when said keyboard is set in an opened state, and
   the processor enables starting of software that generates a keyboard graphical user interface on the display screen when the keyboard is in a closed state, said keyboard graphical user interface being a pictoral representation of the keyboard.

2. The information processing apparatus as claimed in claim 1,
   wherein when the closed state of the keyboard is detected, supply of power to the keyboard is limited, and a low power consumption mode is set.

3. The information processing apparatus as claimed in claim 1,
   wherein when the closed state of the keyboard is detected, one of operating means provided to the apparatus main unit, for performing various operations, and inputting means provided to the apparatus main unit, for inputting various information, is set in a usable state.

4. The information processing apparatus as claimed in claim 1,
   wherein when the opened state of the keyboard is detected, the keyboard is set in a usable state.

5. The information processing apparatus as claimed in claim 1,
   wherein when the opened state of the keyboard is detected, one of operating means provided to the apparatus main unit, for performing various operations, and inputting means provided to the apparatus main unit, for inputting various information, is set in an unusable state.

6. The information processing apparatus as claimed in claim 1,
wherein when the opened state of the keyboard is detected, a utility for making various settings on the keyboard is set in an executable state.

7. The information processing apparatus as claimed in claim 1, wherein the keyboard comprises:
a sensor configured to determine whether the keyboard is in an open state or a closed state; and
a controller configured to send a signal to the apparatus main unit indicating whether the keyboard is in the open state or the closed state.

8. The information processing apparatus as claimed in claim 7, wherein the apparatus main unit includes an operating button disposed on the apparatus main unit, and the apparatus main unit is configured to enable performance of a function associated with the operating button in response to receiving a signal from the controller indicating that the keyboard is in the closed state.

9. The information processing apparatus as claimed in claim 8, wherein the apparatus main unit includes a plurality of operating buttons, and the plurality of operating buttons have same functions as the operating keys of the keyboard.

* * * * *